(12) United States Patent
Karppi et al.

(10) Patent No.: US 11,518,695 B2
(45) Date of Patent: Dec. 6, 2022

(54) METHOD FOR PRODUCING POLYMER SOLUTIONS

(71) Applicant: Kemira Oyj, Helsinki (FI)

(72) Inventors: Asko Karppi, Turku (FI); Matti Hietaniemi, Espoo (FI)

(73) Assignee: Kemira Oyj, Helsinski (FI)

( * ) Notice: Subject to any disclaimer, the term of this patent is extended or adjusted under 35 U.S.C. 154(b) by 467 days.

(21) Appl. No.: 16/607,109

(22) PCT Filed: May 15, 2018

(86) PCT No.: PCT/FI2018/050360
§ 371 (c)(1),
(2) Date: Oct. 22, 2019

(87) PCT Pub. No.: WO2018/211173
PCT Pub. Date: Nov. 22, 2018

(65) Prior Publication Data
US 2020/0377673 A1 Dec. 3, 2020

(30) Foreign Application Priority Data
May 16, 2017 (FI) ...................................... 20175441

(51) Int. Cl.
| | | |
|---|---|---|
| *D21H 21/10* | (2006.01) | |
| *C02F 1/56* | (2006.01) | |
| *C08J 3/05* | (2006.01) | |
| *D21H 17/15* | (2006.01) | |
| *D21H 17/37* | (2006.01) | |
| *C02F 11/147* | (2019.01) | |
| *C02F 103/28* | (2006.01) | |

(52) U.S. Cl.
CPC ........ *C02F 1/56* (2013.01); *C08J 3/05* (2013.01); *D21H 17/15* (2013.01); *D21H 17/375* (2013.01); *D21H 21/10* (2013.01); *C02F 11/147* (2019.01); *C02F 2103/28* (2013.01); *C08J 2333/26* (2013.01)

(58) Field of Classification Search
CPC ..... C08L 2205/02; C08L 33/26; D21H 17/37; D21H 23/76; D21H 21/06; D21H 17/71; D21H 17/70; D21H 17/375; D21H 21/10; D21H 17/15; C08J 3/05; C08J 2333/26; C02F 2103/28; C02F 1/56; C02F 11/147; C08F 220/56; C08F 220/34; C08F 226/04
USPC ....................................................... 162/168.3
See application file for complete search history.

(56) References Cited

U.S. PATENT DOCUMENTS

| | | |
|---|---|---|
| 5,443,741 A | 8/1995 | Stott et al. |
| 5,569,385 A | 10/1996 | O'Carroll et al. |
| 2004/0250354 A1 | 12/2004 | Hamers et al. |

FOREIGN PATENT DOCUMENTS

| | | |
|---|---|---|
| CN | 1187494 A | 7/1998 |
| CN | 101094870 A | 12/2007 |
| CN | 103221608 A | 7/2013 |
| EP | 0805234 A2 | 11/1997 |
| WO | 2009095245 A2 | 8/2009 |
| WO | 2012018514 A2 | 2/2012 |
| WO | 2017005562 A1 | 1/2017 |
| WO | 2017037335 A1 | 3/2017 |
| WO | 2018096211 A1 | 5/2018 |

OTHER PUBLICATIONS

Finnish Patent and Registration Office, Search Report of FI20175441, dated Dec. 12, 2017.

*Primary Examiner* — Mark Halpern
(74) *Attorney, Agent, or Firm* — Meunier Carlin & Curfman LLC

(57) ABSTRACT

A method for producing an aqueous copolymer solution, which comprises dissolving a copolymer of (meth)acrylamide and at least 1 mol-% cationic monomers, calculated from total amount of monomers in the dissolving water having calcium hardness of at least mg/l, expressed as $Ca^{2+}$, and adding acid comprising monoprotic organic acid and/or mineral acid to the dissolving water and/or the aqueous solution of the copolymer in an amount sufficient to provide the aqueous solution of the copolymer with a pH of equal to or less than 4.5. The invention also relates to uses of the obtained polymer solutions in manufacturing of paper, board or the like or in treatment of sludge or water.

20 Claims, 1 Drawing Sheet

METHOD FOR PRODUCING POLYMER SOLUTIONS

PRIORITY

This application is a U.S. national application of the international application number PCT/FI2018/050360 filed on May 15, 2018 and claiming priority of Finnish application 20175441 filed on May 16, 2017 the contents of all of which are incorporated herein by reference.

FIELD OF THE INVENTION

The present invention relates to a method for producing an aqueous polymer solution according to the independent claim presented below. The invention also relates to uses of the obtained polymer solutions in manufacturing of paper, board or the like or in treatment of sludge or water.

BACKGROUND OF THE INVENTION

Polyacrylamides are commonly used as auxiliary substances in various processes such as in wastewater treatment and paper industry.

The polyacrylamide polymers are often manufactured in a form that is not a solution, for example they can be dry powders, emulsions or dispersions. For the use polyacrylamide polymers should be in the form of an aqueous solution. If water used as dissolving water has high calcium hardness, problems relating to the functionality of the polymers have observed. This kind of dissolving water condition occurs e.g. in many paper and board manufacturing locations, wherein only water with high calcium hardness is available. Problem in dissolving with hard water is that performance of the polyacrylamide polymer solution drops and also viscosity of the polymer solution may change. Cationic polyacrylamides have typically been acidified during manufacturing of the polymers. The acidification has been carried out by using polyprotic acid, such as e.g. adipic acid and/or citric acid. Thus, the anionic groups of the polymer and added polyprotic acids may complex with any multivalent cationic species present in the aqueous solution of the polymer, such as $Ca^{2+}$ or $Mg^{2+}$ ion abundantly present in hard waters, and with cationic groups of polymer. In similar way complex formation may occur between cationic and anionic charges present in the polymer chain, such as in case of amphoteric polymers, but also in case of cationic polymers as typically some of the cationic groups may hydrolyse into anionic groups during manufacture or storage. Complex formation causes the macromolecular chains of the polymer to compress into loops and tails. A copolymer having its macromolecular chains compressed may not benefit to the fullest extent from its molecular weight in applications where high molecular weight and dimensional extension are needed, such as flocculation of suspended solids, thereby providing lower performance than the same polymer in non-complexed form.

SUMMARY OF THE INVENTION

It is an object of the present invention to reduce or even eliminate the above-mentioned problems appearing in prior art.

The object of the invention is to provide a method for dissolving water-soluble copolymers in dissolving water having high calcium hardness and/or alkalinity.

It is especially an object of the present invention to provide a method for pH adjustment of copolymer solution when using dissolving water with high calcium hardness and/or alkalinity.

Another object of the invention is to provide an arrangement or a polymer dissolving unit, with which the method of the invention can be carried out in the form of batch processing of the copolymer solution.

In order to achieve among others the objects presented above, the invention is characterized by what is presented in the characterizing parts of the enclosed independent claims.

Some preferred embodiments of the invention will be described in the other claims.

The embodiments and advantages mentioned in this text relate, where applicable, both to the method, the polymer dissolving unit as well as to the uses according to the invention, even though it is not always specifically mentioned.

A typical method according to the invention for producing an aqueous copolymer solution to be added into an aqueous suspension comprising solid particles to be flocculated comprises the steps of
- dissolving a copolymer of (meth)acrylamide and at least 1 mol-% cationic monomers, calculated from total amount of monomers, in the dissolving water having calcium hardness of at least 5 mg/l, expressed as $Ca^{2+}$, whereby an aqueous solution of the copolymer is obtained, and
- adding acid to the dissolving water before combining with the copolymer and/or to the obtained aqueous solution of the copolymer in an amount sufficient to provide the aqueous solution of the copolymer with a pH of equal to or less than 4.5, wherein the acid comprises monoprotic organic acid and/or mineral acid.

Typically, an aqueous solution of the copolymer obtained by the method of the invention is used for flocculation of suspended solids. The aqueous solution of the copolymer may be used as a retention or drainage aid in manufacturing of paper, board or the like. The aqueous solution of the copolymer may also be used as a flocculant in sludge dewatering or in microflotation in water treatment.

A typical process for flocculating suspended solid particles in manufacturing of a paper, board or the like, or in treatment of sludge or water comprises
- providing an aqueous solution of the copolymer obtained by the method according to present invention, and
- adding the aqueous solution of the copolymer into an aqueous suspension comprising solid particles to be flocculated.

More detailed, a typical process for flocculating suspended solid particles in manufacturing of a paper, board or the like, or in treatment of sludge or water comprises
- providing an aqueous solution of the copolymer by dissolving a copolymer of (meth)acrylamide and at least 1 mol-% cationic monomers, calculated from total amount of monomers, in the dissolving water having calcium hardness of at least 5 mg/l, expressed as $Ca^{2+}$, and by adding acid to the dissolving water before combining with the copolymer and/or to the obtained aqueous solution of the copolymer in an amount sufficient to provide the aqueous solution of the copolymer with a pH of equal to or less than 4.5, wherein the acid comprises monoprotic organic acid and/or mineral acid, and
- adding the aqueous solution of the copolymer into an aqueous suspension comprising solid particles to be flocculated.

A typical polymer dissolving unit according to the invention comprises
- a dissolving tank equipped with an agitator,
- a polymer inlet line connected to the dissolving tank for supplying polymer into the dissolving tank,
- at least one water inlet arranged in connection with the polymer inlet line and/or directly connected to the dissolving tank,
- an acid inlet connected to the dissolving tank and/or to at least one water inlet, and
- an acid storage vessel and an acid dosing pump for supplying the acid from the acid storage vessel to said acid inlet.

It has been surprisingly found that above mentioned problems appearing in the prior art can be alleviated by using acid comprising monoprotic organic acid, such as formic acid, and/or mineral acid to adjust pH of the copolymer solution below the first pKa of the anionic monomer that may be present in the copolymer, or below the second pKa:s of the polyprotic acids that may be present in copolymer composition to be dissolved. The pH may be adjusted for example at least about 0.5 pH unit below said pKa:s.

The pH adjustment by using acid comprising monoprotic organic acid and/or mineral acid inhibits complex structure of the copolymer in water with high hardness since then the complex formation between the cationic groups of the copolymer and any multivalent anionic species present in the aqueous solution of the copolymer, such as $Ca^{2+}$ or $Mg^{2+}$ ion abundantly present in hard waters, and even any anionic charges present in the copolymer itself, may be effectively prevented and also already formed complexes may also be unraveled. The ion complexing of the copolymer decreases when the pH of the copolymer solution is adjusted to be equal to or less than 4.5, such as equal to or less than 4.2, preferably equal to or less than 4.0, especially equal to or less than 3.8, as the amount of ions available for crosslinking decreases significantly, turning into non-ionic form. The lower the pH is compared to the first pKa of the anionic monomer that may be present in the copolymer or below the second pKa:s of the polyprotic acids that may be present in copolymer composition to be dissolved, the less the copolymer is in complexed form, thereby providing better end-use performance of the copolymer such as flocculation. Additionally, the added acid may form ion bonds with the $Ca^{2+}$ and/or $Mg^{2+}$ ions present during dissolving of the copolymer, thereby decreasing complex formation of these ion species with the anionic groups of the copolymer, although this effect is only supplementary and may not be as efficient in preventing the copolymer from complexing as the adjustment of the pH to the indicated level. Thus, the copolymer remains substantially non-complex in the obtained aqueous solution of the copolymer and the functionality of the copolymer remains also in calcium containing waters. The benefit of the present invention is thus that same copolymer dissolved provides a substantially same functionality with the smaller dosage.

A dissolving method according to the present invention may inhibit viscosity decrease of the aqueous solutions of copolymer and so the obtained copolymer solution may have greater viscosity when it is added into an aqueous suspension comprising solids, such as a fibre suspension or water to be treated. However, it should be noted that viscosity of the copolymer solution may decrease with dissolving method according to invention as viscosity may decrease due to increased conductivity too and not only due to ion-complex formation. The dissolving method according to the invention is especially suitable for high molecular weight copolymers such as sludge dewatering or papermaking flocculants without damaging or affecting their performance. The method according to the invention improves significantly flocculation and/or drainage performance and/or retention performance in the situations where water with high hardness and/or alkalinity is used as dissolving water.

The dissolving method according to the present invention can be performed at one stage without adding complexity compared to existing dissolving devices or arrangements.

DESCRIPTION OF THE DRAWINGS

The invention will be described in more detail with reference to appended drawings, in which.

DETAILED DESCRIPTION OF THE INVENTION

Figure 1:
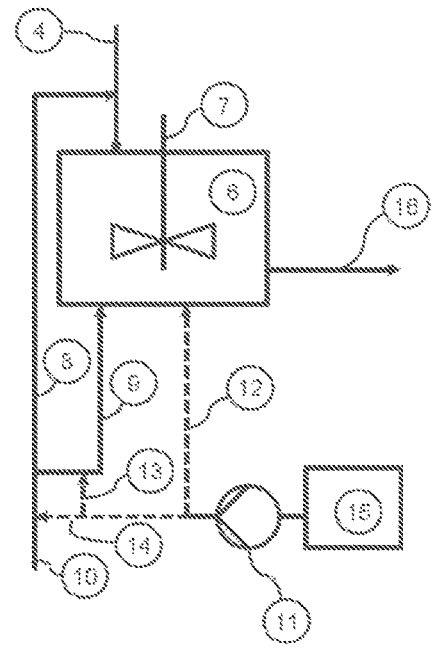
FIG. 1 shows a polymer dissolving unit suitable for use in the present invention.

For the purposes of this description, the term "copolymer" refers to copolymer containing (meth)acrylamide as a monomeric component. The copolymer is obtained by copolymerisation of acrylamide and/or methacrylamide together with one or more other monomers. According to the present invention the copolymer comprises (meth)acrylamide and at least 1 mol-% structural units originating cationic monomers. The percentage values are calculated from the total amount of the monomers.

The cationic groups in the copolymer may originate from monomers selected from 2-(dimethylamino)ethyl acrylate (ADAM), [2-(acryloyloxy)ethyl]trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl]trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC). Preferably the cationic groups may originate from monomers selected from [2-(acryloyloxy) ethyl] trimethylammonium chloride (ADAM-Cl), [3-(acryloylamino)propyl] trimethylammonium chloride (APTAC), and [3-(methacryloylamino)propyl] trimethylammonium chloride (MAPTAC). More preferably the cationic monomer is [2-(acryloyloxy)ethyl] trimethylammonium chloride (ADAM-Cl). Cationic groups which are derived of ester containing cationic monomers, especially ADAM-Cl, are sensitive to hydrolysis during manufacture and/or storage. Hydrolysis of e.g. cationic group of ADAM-Cl leads into formation of an anionic group, which is same as polymerized acrylic acid, which may then form ionic bond with the non-hydrolysed cationic groups of the copolymer causing decreased performance of the copolymer. Therefore, the copolymers comprising these cationic monomers may benefit most from the dissolving method of the present invention.

It has been noted that in the view of the complex formation, the copolymers comprising 1-15 mol-% of cationic monomers are most challenging. Higher charged polymers than 15 mol-% are usually already compressed due to amount of counter ions needed for high charge polymer. In cases, where the flocculated material comprises fibres and mineral pigments or fillers, the complexing of the copolymer comprising 1-15 mol-% of cationic monomers due to elevated hardness influences the flocculation performance of the mineral pigments or fillers. Even more demanding is the condition where the aqueous suspension comprising solid particles to be flocculated has conductivity>1.5 mS/cm, because then the copolymer chains may be compressed, or maintained in the compressed form, and formed flocs further in the application thereby decreasing retention, drainage and/or dewatering effect in manufacturing of a paper, board or the like, or in treatment of sludge or water.

The copolymer may also comprise anionic groups. The anionic groups in the copolymer may originate from monomers selected from unsaturated mono- or dicarboxylic acids, such as (meth)acrylic acid, maleic acid, fumaric acid, itaconic acid, aconitic acid, mesaconic acid, citraconic acid, crotonic acid, isocrotonic acid, angelic acid or tiglic acid. Preferably the anionic groups originate from acrylic acid or itaconic acid. The anionic groups may be present in the copolymer in amounts of 0.2-20 mol-%, such as 0.5-10 mol-%.

According to one preferable embodiment the copolymer has a net cationic charge.

The mass average molecular weight MW of the copolymer may be in the range of 2 000 000-30 000 000 g/mol, preferably 2 000 000-20 000 000 g/mol, more preferably 4 000 000-16 000 000 g/mol. In this application the value "mass average molecular weight" is used to describe the magnitude of the polymer chain length. Mass average molecular weight values are calculated from intrinsic viscosity results measured in a known manner in 1N NaCl at 25° C. by using an Ubbelohde capillary viscometer. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M a$, where $[\eta]$ is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide). Accordingly, value of parameter K is 0.0191 ml/g and value of parameter "a" is 0.71. The average molecular weight range given for the parameters in used conditions is 490 000-3 200 000 g/mol, but the same parameters are used to describe the magnitude of molecular weight also outside this range. pH of the polymer solutions for intrinsic viscosity determination is adjusted to 2.7 by using mineral acid, such as hydrochloric acid.

According to an embodiment of the invention the standard viscosity of the copolymer is 2-6 mPas, preferably 3-5 mPas, measured at 0.1 weight-% polymer concentration in 1 M NaCl, at 25° C. and pH 3.0-3.5, using Brookfield DVII T viscometer, in an aqueous medium. The pH may be adjusted for standard viscosity determination by using any conventional acid for pH adjustment, such as hydrochloric acid.

The dissolving method according to the present invention is especially beneficial for copolymers comprising 0.2-10 weight-%, preferably 0.5-5 weight-% of polyprotic acid. The polyprotic acid may originate from acids present during polymerization of the copolymer and/or added post-polymerization. The polyprotic acid is typically adipic acid and/or citric acid.

The method of the present invention is suitable for dissolving copolymers comprising (meth)acrylamide in form of particles, emulsion or dispersion. Especially, the method of the present invention is suited for dissolving water-soluble copolymers, such as polyacrylamides, present in a polymer composition having a particle form. In the context of the present application the term "particle form" denotes discrete solid particles or granules. According to one embodiment of the invention the polymer composition comprises particles or granules of the copolymer, which have an average particle size of <2.5 mm, preferably <2.0 mm, more preferably <1.5 mm. These particles are obtained by mechanical comminution, such as cutting, milling, shredding, chopping or the like. However, the method according to the invention is not limited to above mentioned particle sizes, but the method is not sensitive to the particle size distribution of the polymer particles or granules used. Typically, the solids content of the polymer composition having particle form may be >80 weight-%, preferably >85 weight-%, more preferably in the range of 80-97 weight-%, even more preferably 85-95 weight-%. The high solids content is typical as it is beneficial in view of storage and transport properties of the polymer composition.

The term "water-soluble" is understood in the context of the present application that the copolymer composition is fully miscible with water. When mixed with excess of water, the copolymer in the polymer composition is preferably fully dissolved and the obtained polymer solution is preferably essentially free from discrete polymer particles or granules. Excess of water means that the obtained polymer solution is not a saturated solution.

The copolymers are used as an aqueous solution so when used, the water-soluble copolymer composition is dissolved into water, whereby an aqueous solution of the copolymer is obtained. The copolymer content of said aqueous solution may be in the range of 0.05-2 weight-%, preferably 0.1-1 weight-%, and more preferably 0.2-0.8 weight-%. If the copolymer content is higher, then the viscosity of the aqueous solution is too high, and mixing is difficult and not efficient enough. If the copolymer content is lower, then the amount of acid required for providing pH of equal to or less than 4.5 is high and so economically not feasible. According to an embodiment of the invention, the obtained aqueous solution of the copolymer is further diluted by 1:2-1:20, preferably 1:2-1:10, more preferably 1:2-1:5, with post dilution water prior to an addition into the aqueous suspension comprising solid particles to be flocculated. Typically, an amount of post dilution water is added at most 2 seconds before use of the copolymer solution. It has been observed that about 2 seconds is the reaction time of ionic bonds. In this embodiment any amount of post dilution water may be used provided that the amount is added to the copolymer solution at most 2 seconds before the copolymer is used for the intended application, typically for flocculating suspended solids, as even though the pH of the copolymer solution may increase to over 4.5, since there is not enough time for the ionic bonds to form again compressing the copolymer. If the time was longer and amount of added post dilution water higher, there would be a pH change and then complex formation would start and the performance of the copolymer decrease. In other words, an aqueous solution of the copolymer of 0.05-2 weight-% concentration may be prepared as a first step, then, as a second step, immediately prior to use a further dilution to concentration of use.

The method according to the invention is especially designed to be used in dissolving copolymers of (meth) acrylamide and at least 1 mol-% cationic monomers, preferably in dissolving copolymers of (meth)acrylamide and 1-15 mol-% cationic monomers, when dissolving water has high calcium hardness and/or alkalinity. Typically, calcium hardness of the dissolving water is at least 5 mg/l, expressed as $Ca^{2+}$, wherein the dissolving method of the present invention has found to be useful for preventing complex formation. In some embodiments of the invention, calcium hardness of the dissolving water may be at least 50 mg/l, preferably at least 150 mg/l, expressed as $Ca^{2+}$, which is observed to cause polymer complexing. In some embodiments, calcium hardness of the dissolving water may be in the range of 10-500 mg/l, 50-400 mg/l, 100-300 mg/l or 200-300 mg/l, expressed as $Ca^{2+}$. Even higher calcium hardness of the dissolving water has denoted, and the method has observed to perform well. Sometimes the dissolving water may additionally have elevated alkalinity. Alkalinity is the name given to the quantitative capacity of an aqueous solution to neutralize an acid. Alkalinity may affect the copolymer performance as it changes the pH of the solution and increases ionicity of the solution as the ionisable groups are mainly deprotonated at elevated alkalinity. In some embodiments, alkalinity of the dissolving water may be above 50 ppm, such as above 100 ppm or above 300 ppm, expressed as $CaCO_3$.

In the dissolving method according to the invention, the acid comprising monoprotic organic acid and/or mineral acid is used to adjust pH of the aqueous solution of the copolymer to be added into aqueous suspension comprising solid particles to be flocculated. According to the invention the acid comprising monoprotic organic acid and/or mineral acid is added to the dissolving water before combining with the copolymer and/or to the obtained aqueous solution of the copolymer in an amount sufficient to provide the obtained aqueous solution of copolymer with a pH of equal to or less than 4.5 or equal to or less than 4.0 or especially equal to or less than 3.8. If the pH of the obtained aqueous solution of copolymer is over 3.8 or 4 and especially over 4.5, complexing of the copolymer may happen especially when using dissolving water with high calcium hardness. According to an embodiment of the invention the acid is added in an amount sufficient to provide the obtained aqueous solution of copolymer with a pH of 2-4.5, preferably 2.5-4, more preferably 2.8-3.8. In the embodiment of the invention, the acid to be added may be a mixture comprising monoprotic organic acid and/or mineral acid, or the acid may be monoprotic organic acid or mineral acid.

Monoprotic organic acid refers to an acid having only one dissociable proton. According to an embodiment of the invention monoprotic organic acid is formic acid or acetic acid. According to an embodiment of the invention, the mineral acid may be sulphuric acid, nitric acid, hydrochloric acid or sulfonic acid. According to an embodiment of the invention, the acid comprising monoprotic organic acid is used in the method of the present invention, since they are less corrosive than mineral acids and therefore not harmful for the equipment. In a preferred embodiment of the invention, the monoprotic organic acid is formic acid, since formic acid is more efficient in adjusting the pH than acetic acid. Formic acid also has a good applicability. Further, the cost of the formic acid is low compared to 20-60% savings in copolymer consumption in application. It is also convenient to use monoprotic organic acid as a buffering acid since little changes in dosage amounts and dissolving water quality changes do not affect too significantly the pH level.

The required amount of the monoprotic organic acid or mineral acid is dependent on water hardness, i.e. calcium hardness of the dissolving water. According to an embodiment of the invention the monoprotic organic acid is formic acid added in an amount of 0.2-10 weight-% of copolymer content, which may be beneficial amount when the dissolving water has calcium harness ca. 10-500 mg/l. According to another embodiment the monoprotic organic acid is formic acid added preferably in an amount of 1-6 weight-% of copolymer content, which may be beneficial amount when the dissolving water has calcium harness ca. 50-400 mg/l.

According to the invention, acid is added to the dissolving water before combining with the copolymer and/or the obtained aqueous solution of the copolymer after copolymer has dissolved for providing the obtained aqueous solution of the copolymer with a pH of equal to or less than 4.5 or equal to or less than 4.0 or equal to or less than 3.8. According to some embodiments of the invention acid may be added to the dissolving water before combining with copolymer, or acid may be added to the copolymer solution in the dissolving tank after copolymer has dissolved, or acid and copolymer may be added simultaneously but separately to the dissolving water in the dissolving tank; and any combinations of these additions. In an embodiment, at least part of the acid is added to the dissolving water before combining with copolymer and acid is also added after the addition of the copolymer for adjusting pH of the copolymer solution to be equal to or less than 4.5 or equal to or less than 4.0 or equal to or less than 3.8.

An aqueous solution of the copolymer obtained by the method according to the present invention may be used for flocculating suspended solids. The aqueous solution of the copolymer may be used as a retention or drainage aid in manufacturing of paper, board or the like, or as a flocculant in sludge dewatering or in microflotation, such as dissolved air flotation in water treatment. In a typical process an aqueous solution of the copolymer obtained by the method according to the invention is added into aqueous suspension comprising solid particles to be flocculated. The aqueous suspension may be fibre suspension, or water or sludge to be treated.

According to an embodiment of the invention, an aqueous solution of the copolymer obtained by the method according to the invention is added to a fibre suspension and the fibre suspension is formed into a fibrous web. Fibre suspensions typically consist of a mixture of cellulosic fibres, cellulosic fines, mineral filler, and chemical additives. The copolymers help attaching fine elements to fibres but also cause additional fibre flocculation.

In an embodiment of the invention, the aqueous solution of the copolymer is diluted by 1:2-1:20, preferably 1:2-1:10, more preferably 1:2-1:5, with post dilution water at most 2 seconds prior to an addition into the aqueous suspension. Preferably, the aqueous solution of the copolymer has a pH of equal to or less than 4.5, or preferably equal to or less than 4.0, or more preferably equal to or less than 3.8, when added into the aqueous suspension.

The aqueous solutions of the copolymer are produced by using batch process. Typically, the dissolving of the copolymer is carried out in the polymer dissolving tank equipped with an agitator. The required amount of the copolymer is added to dissolving water with stirring and dissolved in water. Typically, at first a dissolution tank is filled with water. Copolymer and acid may be added separately or simultaneously into the dissolving tank as described above.

A residence time of the aqueous solution of copolymer in the dissolving tank, i.e. the dissolution time, may be from 15 min to 3 hours, typically it is about 30 min to 60 min. Depending on the kind of the copolymer being dissolved, the dissolution time may vary. Also, the temperature of the dissolving water affects the required dissolution time.

The monoprotic organic acids, such as formic acid, and mineral acids are in a form of liquid and so the application of acid is easy to include in dissolving units.

Figure 2:
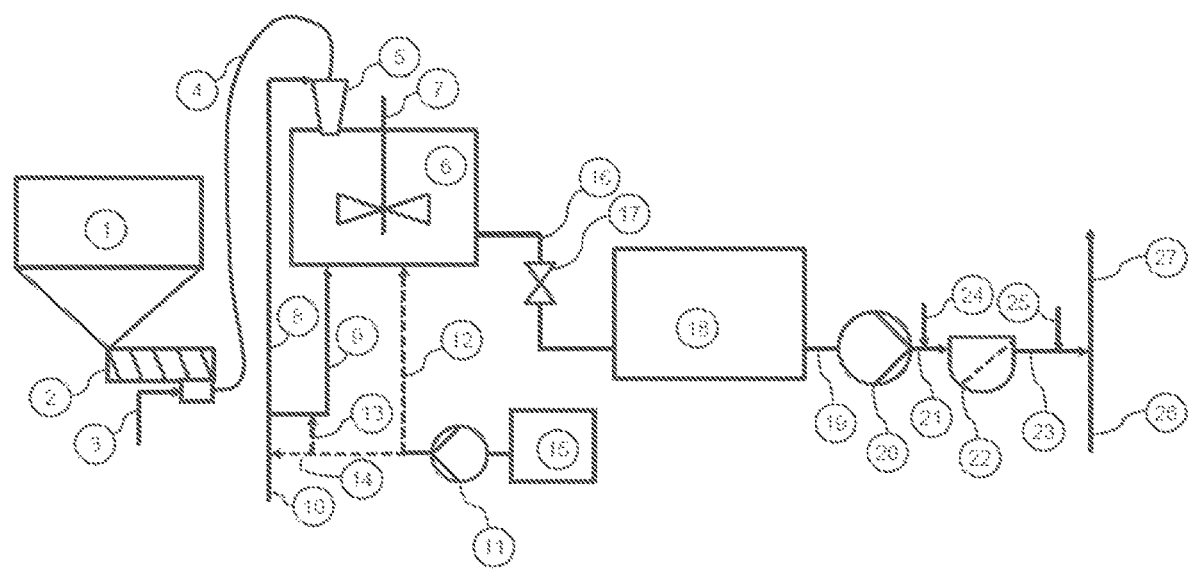
FIG. 2 shows a process chart of dry polymer dissolving process according to an embodiment of the invention.

A polymer dissolving unit is presented in FIG. 1. FIG. 2 shows a detailed process chart according to an embodiment of the invention for illustrating also the process and equipment after the polymer dissolving unit.

In FIGS. 1 and 2 the following reference numbers are used:

1 Dry polymer vessel
2 Polymer discharge unit
3 Pressurized air
4 Polymer inlet line
5 Ejector
6 Dissolving tank
7 Dissolving tank agitator
8 Polymer dissolving water inlet line
9 Dissolving tank filling water inlet line
10 Water inlet line
11 Acid dosing pump
12 Alternative acid dosing inlet to dissolving tank
13 Alternative acid dosing inlet to dissolving tank filling water
14 Alternative acid dosing inlet to dissolving water
15 Acid storage vessel
16 Dissolved polymer outlet
17 Means to emptying dissolving tank, e.g. valve
18 Polymer solution storage tank
19 Polymer solution storage tank outlet
20 Polymer dosing pump
21 Polymer dosing line
22 Filter for insoluble polymer particles (optional)
23 Filtered polymer line
24 Polymer post dilution prior filtering (optional)
25 Polymer post dilution prior to dosing (optional)
26 Fibre suspension
27 Flocculated fibre suspension The dissolving method according to the present invention can be carried out batch mode in the polymer dissolving unit presented in FIG. 1. The polymer dissolving unit comprises a dissolving tank 6 equipped with agitator 7. A polymer inlet line 4 for polymer particles (powder), emulsion or dispersion is connected to the dissolving tank. An embodiment presented in FIG. 1 a water inlet line 10 of the dissolving water is divided to two alternative water inlets into the dissolving tank. A dissolving water inlet line 8 is arranged to supply dissolving water into the dissolving tank in combination with the copolymers. In that case, the dissolving water is combined with the copolymers prior to feed into the dissolving tank, or the dissolving water and the copolymers are added simultaneously but separately into the dissolving tank. A dissolving tank filling water inlet line 9 illustrates dissolving tank filling water inlet, the location may vary, and it is not limited to the arrangement presented in Figures.

The polymer dissolving unit according to the invention further comprises an acid storage vessel 15, from which acid can be dosed into the dissolving tank 6 by using acid dosing pump 11. FIG. 1 presents three alternative acid dosing points 12, 13 and 14. The acid may be added to the dissolving water before combining with copolymer, or acid may be added to the dissolving water supplied directly into dissolving tank, or acid may be added to the copolymer solution in the dissolution tank, or any combinations of these addition points.

The obtained aqueous solution of the copolymer is discharged from the dissolving tank via outlet connection 16.

In a typical dissolving method, the dissolving tank is firstly filled with at least part of the quantity of water necessary for a solution batch. When using dry copolymer, the copolymer particles or granules (i.a. powder) are typically supplied into a dissolving tank 6 by using a pneumatic feed from a polymer storage vessel 1, but also other supplying or conveying methods can be used. FIG. 2 shows polymer discharge unit 2 and pressurized air supply 3 for discharging dry copolymers from storage vessel 1 to the dissolving tank 6. At least a part of the dissolving water may be feed in combination of the copolymer particles or granules into the dissolving tank, wherein the copolymer particles or granules are wetted prior to conveying into the dissolving tank. The copolymers and dissolving water may be combined in an ejector 5.

The dissolving tank is equipped with an agitator 7 and the mixture of the copolymer and the dissolving water is mixed continuously for homogenizing the copolymer mixture with the dissolving water and preventing any copolymer particles, like gel particles, from settling before the copolymer to be fully dissolved.

The acid may be added to the dissolving water before combining with copolymer, or acid may be added to the copolymer solution in the dissolving tank, or acid and copolymer may be added simultaneously but separately to the dissolving water in the dissolving tank; and any combinations of these additions. The acid to be added, such as monoprotic organic acid or mineral acid, is in a form of liquid, and so it is easy to add directly in the dissolving tank 6 and/or to the water inlet lines by using conventional pump or the like.

When the copolymer is substantially fully dissolved, the obtained aqueous solution of the copolymer is discharged from the dissolving tank 6 and transferred to polymer solution storage tank 18. From storage tank the aqueous solution of the copolymer can be dosed into aqueous suspension comprising solid particles to be flocculated, such as fibre suspension 26. The aqueous solution of the copolymer may be post diluted prior to addition into aqueous suspension comprising solid particles to be flocculated. If the polymer solution comprises insoluble polymer particles, they may also be filtered from the solution by using filter 22 arranged in a suitable location in the process line.

EXPERIMENTAL

A better understanding of the present invention may be obtained through the following examples which are set worth to illustrate, but are not to be construed as the limit of the present invention.

Example 1: Dissolving Test

Dry cationic polyacrylamide polymer "Product A" is dissolved in waters which contain different pH and $Ca^{2+}$ contents.

Product A is a dry polymer product, which is a combination of a cationic copolymer of acrylamide (90 mol-%) and ADAM-Cl (10 mol-%) and a cationic copolymer of acrylamide (86 mol-%) and DADMAC (14 mol-%), which polymer product contains 1 weight-% of adipic acid, which is used for pH adjustment in the polymerization process, and additionally 3 weight-% of post added dry anhydrous citric acid admixed in a mixer. Product A has standard viscosity 5.0 cP and moisture content of 95%.

Dissolving waters in the dissolving test are the following:
Water1 is de-ionized water.
Water2 is de-ionized water into which is added 7.5 ml formic acid (20%) and then dissolved sodium carbonate 690 mg/litre and calcium carbonate 750 mg/litre. pH of dissolving Water2 is 6.8.
Water3 is the same as dissolving Water2, but 41.5 ml formic acid (20%) is added to adjust pH to 3.8.

A series of dry cationic polyacrylamide products was selected. All of the polymers contained 1 weight-% of adipic acid, which was used for pH adjustment in polymerization process. Citric acid was post added to two of the products. Product D is like Product A but without post-added citric acid. Characteristics of the products are presented in the Table 2.

TABLE 2

| Product | Acrylamide [mol-%] | ADAM-Cl [mol-%] | Copolymer of DADMAC (14 mol-%) and acrylamide (86 mol. %) [wt-%] | Citric acid, post added [wt-% of the product] | Dry content [%] | Std viscosity [cP] |
|---|---|---|---|---|---|---|
| Product A | 90 | 10 | 6 | 3 | 95 | 5.0 |
| Product B | 90 | 10 | 0 | 0 | 95 | 5.5 |
| Product C | 90 | 10 | 0 | 3 | 95 | 5.0 |
| Product D | 90 | 10 | 6 | 0 | 95 | 5.6 |

Product A is dissolved in dissolving water in the following manner. First, 1.05 g of Product A is added slowly to 250 ml of dissolving water at 23° C. under magnetic stirrer stirring at 1200 rpm at 23° C. The mixture is then stirred for 45 min at 23° C. pH and viscosity are determined from the solution. Results of the dissolving test are in the Table 1.

TABLE 1

Dissolving test with Product A

| Test solution | Test | Dissolving water (total 250 ml) | $Ca^{2+}$ content [mg/liter] | pH of polymer solution | Viscosity of polymer solution [mPas] |
|---|---|---|---|---|---|
| 1 | Comparative example | Water1 | 0 | 3.8 | 881 |
| 2 | Comparative example | 125 ml Water1 + 125 ml Water2 | 150 | 6.7 | 82 |
| 3 | Comparative example | Water2 | 300 | 6.8 | 74 |
| 4 | According to the invention | Water3 | 300 | 3.8 | 817 |

The results show that Product A solution, which is dissolved in Water3, in which pH is adjusted to 3.8 contain nearly the same viscosity as test solution 1, in which the copolymer is dissolved in deionized water. Test solutions 2 and 3, in which the copolymer is dissolved in calcium containing water and in which pH of the solutions is neutral has significantly lower viscosity level. Viscosity levels indicate that the copolymer in test solution 4 is in more linear form compared to test solutions 2 and 3, even though $Ca^{2+}$ content in test solution 4 is the same as in test solution 3 and two times higher than in test solution 2.

Example 2: Application Test

Impact of cationic polyacrylamide polymers for dewatering of paper stock was tested.

Polymer product is dissolved in 0.5 weight-% concentration by adding 1.3 g product to 250 ml dissolving water. Dissolving "Water A" is made by dissolving 2.9 g calcium chloride dehydrate to 2 litre of de-ionized water. $Ca^{2+}$ content in "Water A" is 400 mg/litre. Dissolving "Water B" is made by dissolving 2.9 g calcium chloride dehydrate to 2 litre of de-ionized water and 0.5 g formic acid 99 wt-%. "Water B" contains $Ca^{2+}$ 400 mg/litre and formic acid 250 mg/litre. Experiments in which test product is dissolved in "Water A" are marked with letter "A" and experiments in which test product is dissolved in "Water B" are marked with the letter "B". Test products, which are used in the application study, are presented in the Table 3.

TABLE 3

| | pH | Viscosity [mPas] |
|---|---|---|
| Product A, "A" | 3.08 | 114 |
| Product A, "B" | 2.88 | 116 |
| Product B, "A" | 3.70 | 106 |
| Product B, "B" | 3.00 | 105 |
| Product C, "A" | 3.69 | 108 |
| Product C, "B" | 3.00 | 107 |
| Product D, "A" | 4.08 | 130 |
| Product D, "B" | 3.00 | 130 |

Central European testliner board was used as raw material. This testliner contains about 17% ash and 5% surface size starch, which was enzymatically degraded native corn starch. Dilution water was made from tap water by adjusting $Ca^{2+}$ concentration to 520 mg/l by $CaCl_2$ and by adjusting conductivity to 4 mS/cm by NaCl. Testliner board was cut to 2*2 cm squares. 2.7 l of dilution water was heated to 85° C. The pieces of testliner were wetted for 5 minutes in dilution water at 2% concentration before disintegration. Slurry was disintegrated in Britt jar disintegrator with 30 000 rotations. Pulp was diluted to 0.5% by adding dilution water.

A Dynamic Drainage Analyzer, DDA, (AB Akribi Kemikonsulter, Sweden) was used to measure drainage. DDA's vacuum and stirrer were calibrated and necessary adjustments to the settings were made. DDA was connected to a computer for measuring the time between an application of vacuum and the vacuum break point. A change of the vacuum expresses the forming time of a wet fibre web until air breaks through the thickening web indicating the drainage time. A drainage time limit was set to 30 seconds for the measurements.

In drainage measurements, 500 ml of the stock sample was measured into the reaction jar. The drainage test was performed by mixing the sample stock with the stirrer at 1000 rpm for 40 seconds before drainage while the chemicals to be tested were added 15 seconds before drainage. Drainage test was using a wire with 0.25 mm openings. 300 mbar vacuum for 15 s after drainage was used. Drainage time was recorded. Results of the DDA test are presented in the Table 4.

TABLE 4

| | Drainage time [s] with different polymer dosages | | | |
|---|---|---|---|---|
| | 0 kg/t | 0.15 kg/t | 0.30 kg/t | 0.45 kg/t |
| Product A, "A" | 5.77 | 5.16 | 5.12 | 4.72 |
| Product A, "B" | 5.77 | 4.94 | 4.91 | 4.76 |
| Product B, "A" | 5.77 | 5.05 | 4.94 | 4.80 |
| Product B, "B" | 5.77 | 4.75 | 4.84 | 4.70 |
| Product C, "A" | 5.77 | 5.21 | 5.09 | 4.84 |
| Product C, "B" | 5.77 | 5.14 | 5.07 | 4.77 |
| Product D, "A" | 5.77 | 4.99 | 4.83 | 4.92 |
| Product D, "B" | 5.77 | 4.73 | 4.92 | 4.59 |

Drainage test results show that the use of monoprotic acid for pH adjustment improves drainage. Improved drainage is achieved in each case when the product is dissolved in $Ca^{2+}$ containing water which contains formic acid. In addition, the results also show that post added citric acid has negative effect on drainage. Product B and Product D improves more on drainage compared to citric acid containing versions Product C and Product A.

The invention claimed is:

1. A process for flocculating suspended solid particles in manufacturing of a paper, or board, or in treatment of sludge or water, comprising:
 obtaining an aqueous solution of a copolymer by dissolving a copolymer of (meth)acrylamide and at least 1 mol-% cationic monomers, calculated from a total amount of monomers, in dissolving water having a calcium hardness of at least 50 mg/l, expressed as $Ca^{2+}$ and by adding acid to the dissolving water before and/or after dissolving the copolymer in an amount sufficient to provide the aqueous solution of the copolymer with a pH of equal to or less than 4.5, wherein the acid comprises monoprotic organic acid and/or mineral acid, and
 adding the obtained aqueous solution of the copolymer into an aqueous suspension comprising solid particles to be flocculated.

2. The process according to claim 1, wherein the calcium hardness of the dissolving water is at least 50 mg/l, preferably at least 150 mg/l, expressed as $Ca^{2+}$.

3. The process according to claim 1, wherein the monoprotic organic acid is formic acid or acetic acid.

4. The process according to claim 1, wherein the monoprotic organic acid is formic acid added in an amount of 0.2-10 weight % of copolymer content.

5. The process according to claim 1, wherein the copolymer is in a polymer composition having a particle form.

6. The process according to claim 5, wherein the polymer composition comprises particles or granules of the copolymer, which have an average particle size of <2.5 mm.

7. The process according to claim 1, wherein a mass average molecular weight MW of the copolymer is in the range of 2 000 000-30 000 000 g/mol.

8. The process according to claim 1, wherein the copolymer comprises 1-15 mol-% of cationic monomers.

9. The process according to claim 1, wherein standard viscosity of the copolymer is 2-6 mPas, measured at 0.1 weight-% polymer concentration in 1 M NaCl, at 25° C. and pH 3.0-3.5, using Brookfield DVII T viscometer, in an aqueous medium.

10. The process according to claim 1, wherein the copolymer comprises 0.2-10 weight-%, of polyprotic acid.

11. The process according to claim 1, wherein the copolymer content of the obtained aqueous solution of the copolymer is in the range of 0.05-2 weight %.

12. The process according to claim 11, wherein the obtained aqueous solution of the copolymer is further diluted by 1:2-1:20 with post dilution water.

13. The process according to claim 12, wherein the aqueous solution of the copolymer is diluted with post dilution water not more than 2 seconds prior to adding the aqueous solution of the copolymer into the aqueous suspension comprising solid particles.

14. The process according to claim 11, wherein the obtained aqueous solution of the copolymer is further diluted by 1:2-1:5, with post dilution water.

15. The process according to claim 1, wherein the aqueous solution of the copolymer has a pH of equal to or less than 4.2 when added into the aqueous suspension comprising solid particles.

16. The process according to claim 15, wherein the monoprotic organic acid is formic acid added in an amount of 1-6 weight-% of copolymer content.

17. The process according to claim 1, wherein a mass average molecular weight MW of the copolymer is in the range of 4 000 000-16 000 000 g/mol.

18. The process according to claim 1, wherein standard viscosity of the copolymer is 3-5 mPas, measured at 0.1 weight-% polymer concentration in 1 M NaCl, at 25° C. and pH 3.0-3.5, using Brookfield DVII T viscometer, in an aqueous medium.

19. The process according to claim 1, wherein the copolymer content of the obtained aqueous solution of the copolymer is in the range of 0.1-1 weight-%.

20. The process according to claim 1, wherein the aqueous solution of the copolymer has a pH of equal to or less than 3.8, when added into the aqueous suspension.

* * * * *